UNITED STATES PATENT OFFICE.

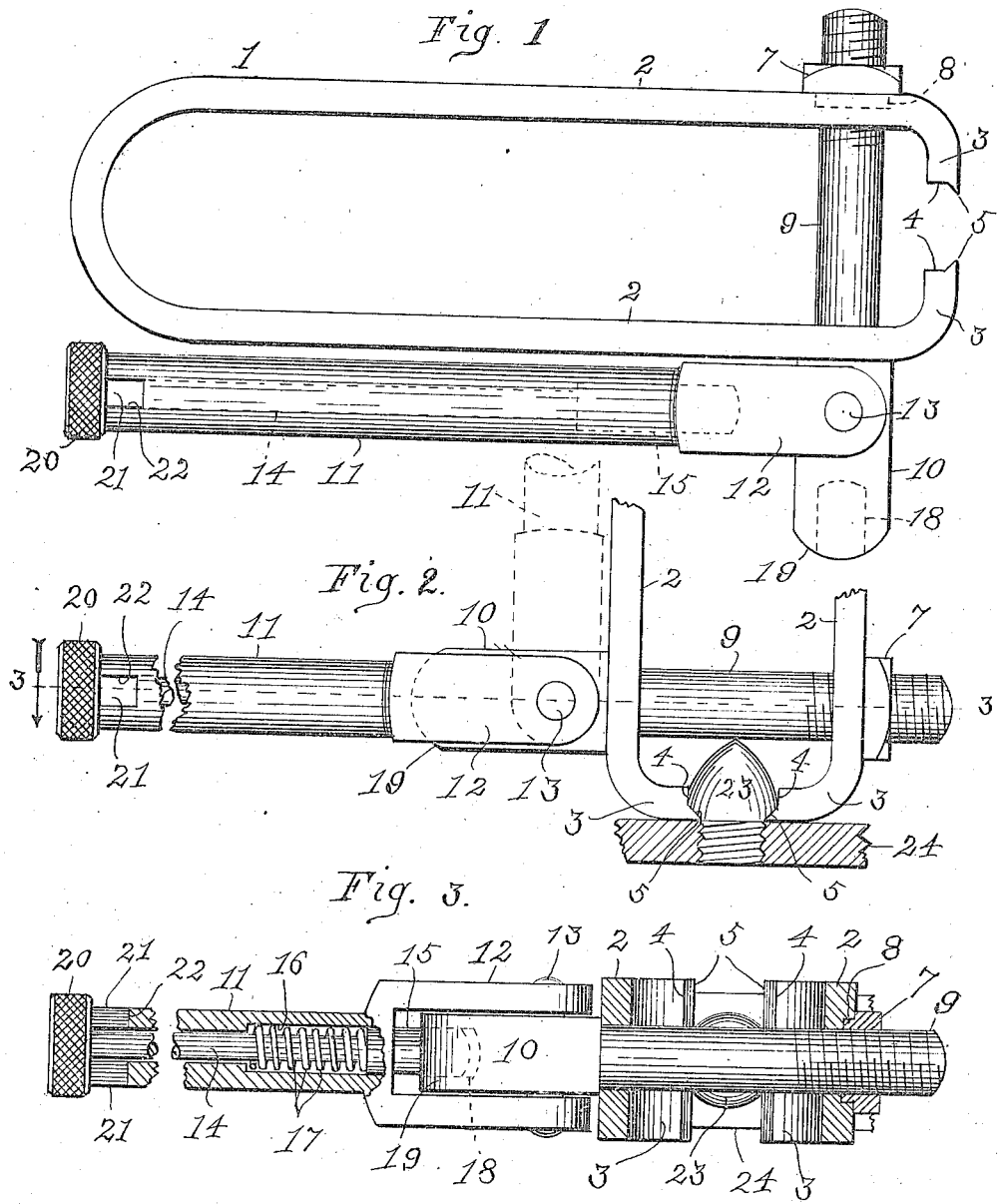

ARNOLD M. LAKE, OF ARGOS, INDIANA.

WRENCH.

1,254,813. Specification of Letters Patent. Patented Jan. 29, 1918.

Application filed June 22, 1917. Serial No. 176,327.

*To all whom it may concern:*

Be it known that I, ARNOLD M. LAKE, a citizen of the United States, residing at Argos, in the county of Marshall and State of Indiana, have invented certain new and useful Improvements in Wrenches, of which the following is a description, reference being had to the accompanying drawings, forming a part of this specification, in which corresponding letters of reference in the different figures indicate like parts.

The object of my invention is to make a simple and effective wrench which shall be so constructed as to provide means for first firmly gripping and then turning a screw-calk nut or other similar article which by reason of wear or otherwise cannot be gripped by the jaws of an ordinary wrench, all of which is hereinafter more particularly described and definitely pointed out in the claims.

In the drawings,

Figure 1 is a side view of the wrench as it would appear when ready to apply to a screw-calk or not.

Fig. 2, is a side view of the same as it would appear when gripping a screw-calk the arm being adjusted ready to unscrew said calk, and Fig. 3, is a plan view partly in section taken upon the line 3—3, Fig. 2, viewed in the direction of the arrow there shown.

Referring to the drawings, 1 indicates generally a U-shaped member formed from spring-steel having parallel arms 2, provided upon their ends with gripping jaws 3, 3, having parallel opposing faces 4, 4, and knife-edges 5, 5, which latter are, by preference flush with the outer faces of the jaws. A nut 7 is secured upon the outer face of one of said arms and is provided with a polygonal counter-sunk portion 8, indicated in dotted lines in Fig. 1 and shown in full lines in Fig. 3, which is fitted in a counterpart recess in said arm to prevent said nut from turning. A bolt 9, screw-threaded upon one end, is passed through bores in the arms 2, 2, and threaded into the nut 7. A rectangular head 10 is formed upon said bolt, the shoulder of which is in contact with one of said arms. An arm 11, is provided with a bifurcated portion 12, which is jointedly connected to the head 10 by means of a bolt or rivet 13 passed through the two prongs of the bifurcation.

The arm 11 is provided with a longitudinal bore throughout its length in which is loosely inserted a rod 14, having a plunger or locking-bolt 15, upon its inner end. An enlarged bore 16, in said arm, longer than the bolt portion 15, provides for the insertion of a coiled spring 17 between the shoulder at one end of the bore and that formed by the bolt, thereby tending to hold the bolt in an extended position. A bore 18 indicated in dotted lines in Figs. 1 and 3, is formed in the outer end of the head 10, the axis of said bore being coincident with that of the bolt 9. Said bore forms a socket for the reception of the bolt 15, when the arm 11 is in alinement with the bolt 9 as shown in Figs. 2 and 3. The length of the head 10 is such, and the end thereof is so rounded as shown at 19, that when the arm 11 is shifted from its normal position as shown in Fig. 1 and indicated in dotted lines in Fig. 2, to one in alinement with the bolt, 9, the end of the locking bolt will be engaged by the rounded surface 19 and pushed back against the tension of the spring until it is in registration with the bore 18, when it will be forced therein by the pressure of the spring and locked in place.

A knurled head 20, is formed upon the outer end of the rod 14, which head is provided with lugs 21 adapted, when the bolt is in a normal position, to enter corresponding longitudinal notches 22 in the end of the arm. This construction enables the rod 14 to be pulled out against the action of the spring 17, thereby enabling the locking-bolt to be withdrawn. When so moved the head may be turned upon its axis to enable the lugs 21 to rest against the end of the arm 11 when the bolt will remain withdrawn. Upon turning said head until the lugs and notches are in registration, the spring will cause the bolt to snap back into place.

The device is especially applicable for the removal of screw-calks from horse-shoes. These calks are screwed firmly into place when attached to the shoe. The wearing of the rounded calks and the rusting of the threads from use render their removal difficult when it becomes necessary to replace them. This cannot be done with an ordinary wrench because of slippage, but is easily accomplished with my improved device, as follows:

Placing the jaws 3 upon opposite sides of a calk 23, in a shoe 24 as shown in Figs. 2 and 3, the operator grasps the arm 11 while in the position indicated in dotted lines in Fig. 2, and using the arm 11 as a crank or lever, rotates the bolt 9 until the knife-edges 5 cut into the calk, as shown, which insures the jaws against slippage. When thus firmly gripped, the arm 11 is moved to the position shown in full lines, when the bolt 15 will be caused to enter the bore 18. The arm is then rigid with the head 10 and may be moved like an ordinary wrench handle, to unscrew the calk.

When the work is accomplished, the operator may pull the head 20 outwardly to its full limit to unlock the bolt and enable the operation to be repeated.

I do not limit myself to the exact construction shown inasmuch as it may be varied without departing from the spirit of the invention.

Having thus described my invention, I claim:

1. A wrench of the class described, comprising opposing knife-edged jaws held normally apart by spring action, a screw for forcing said jaws together and a lever arm pivoted upon an extended portion of said screw, said arm being adapted when in one position to turn said screw upon its axis and when in another to rotate said jaws upon the axis of the article gripped thereby.

2. A screw-calk wrench comprising adjustable opposing jaws provided with indenting means for indenting a screw-calk to prevent the jaws from slipping, a screw for compressing said jaws, and a lever arm pivotally attached to said screw to enable it to be moved at substantially right angles to the axis of said screw and likewise to a position in alinement with the axis of the screw.

3. A wrench, of the class described, comprising adjustable opposing jaws having indenting means for penetrating the periphery of a screw-calk, a headed screw for compressing said jaws, a lever arm pivotally attached to the head of said screw, the axis of said pivot being at right angles to that of said screw and means for locking said lever arm with its longitudinal axis substantially in alinement with the axis of said screw.

4. A wrench of the class described, comprising adjustable counterpart jaws having means upon their opposing faces for penetrating an article to be gripped, a screw for forcing said jaws together, said screw having an extension upon one end and a lever arm jointedly connected to said extension to enable it to first rotate said screw and then to rotate said wrench upon an axis at right angles to that of said screw.

In testimony whereof, I have signed this specification in the presence of two subscribing witnesses, this 19th day of June, 1917.

ARNOLD M. LAKE.

Witnesses:
DAVID E. VAN VAETOR,
M. L. COREY.

Copies of this patent may be obtained for five cents each, by addressing the "Commissioner of Patents, Washington, D. C."